Oct. 5, 1937.  B. B. HOLMES  2,095,031
AUTOMATIC STEERING SYSTEM FOR DIRIGIBLE CRAFT
Filed Feb. 9, 1934   5 Sheets-Sheet 1
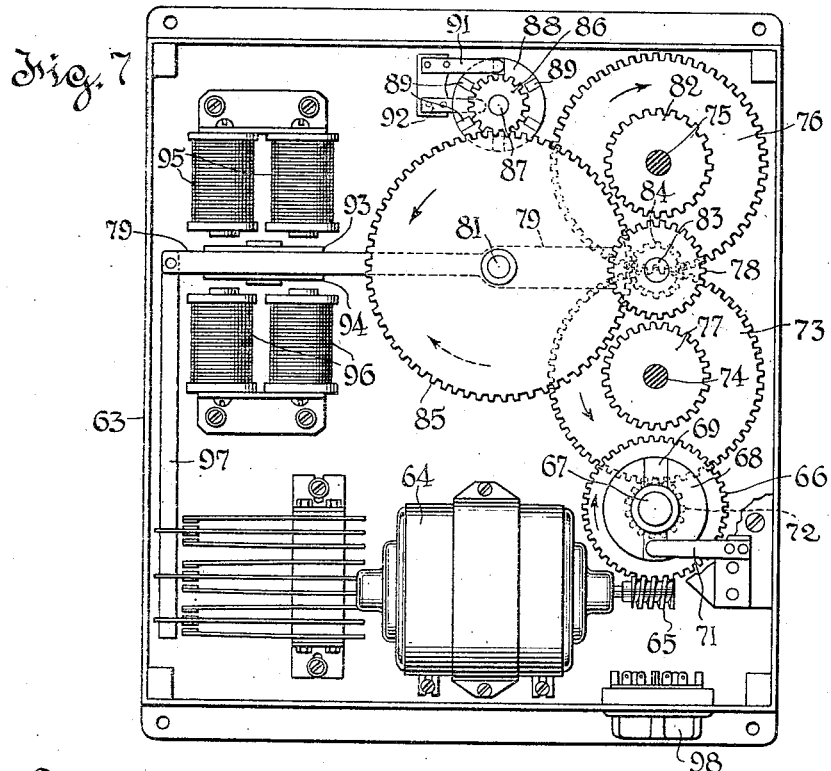
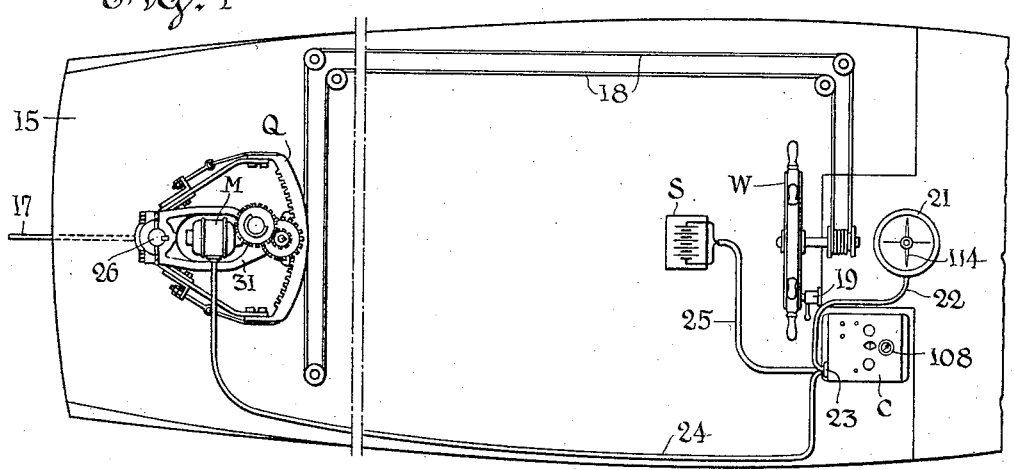
Inventor
Bradford B. Holmes
By
Attorneys

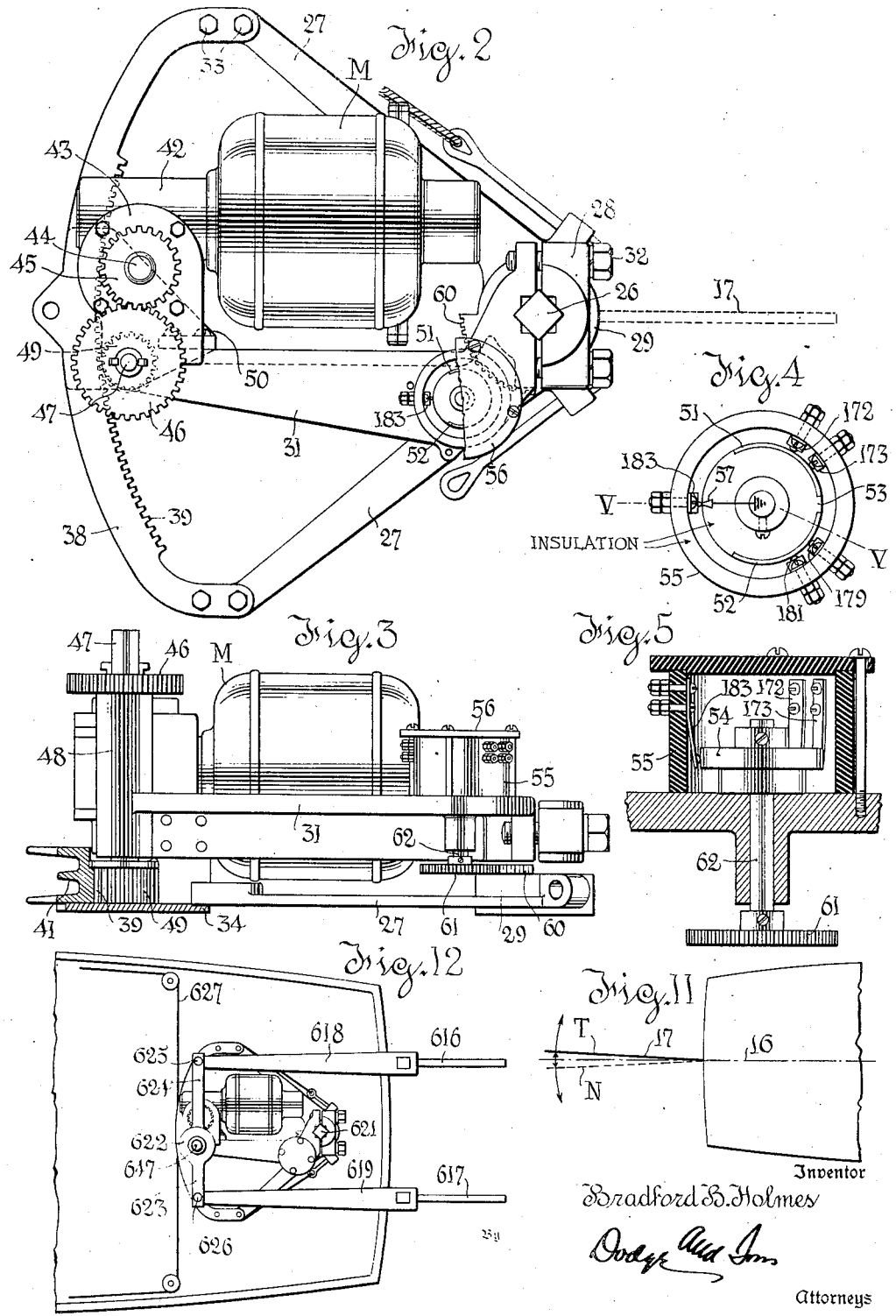

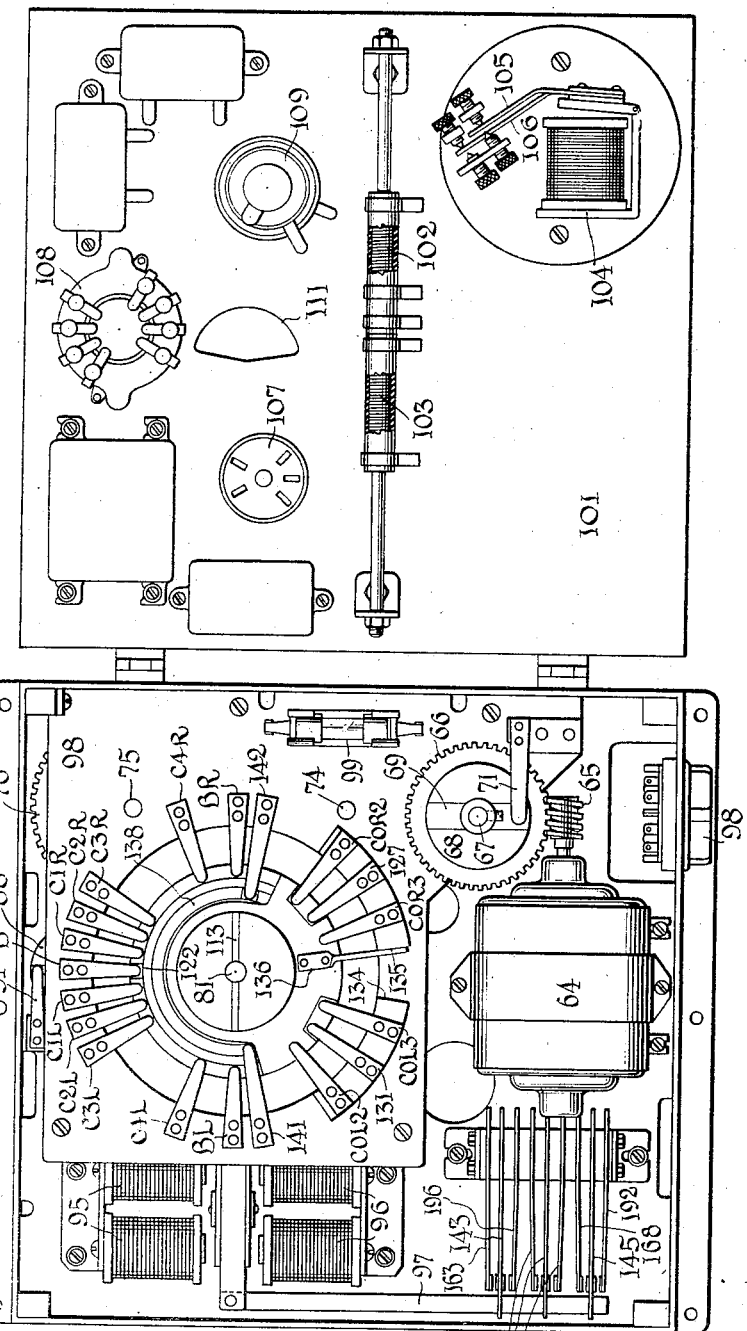

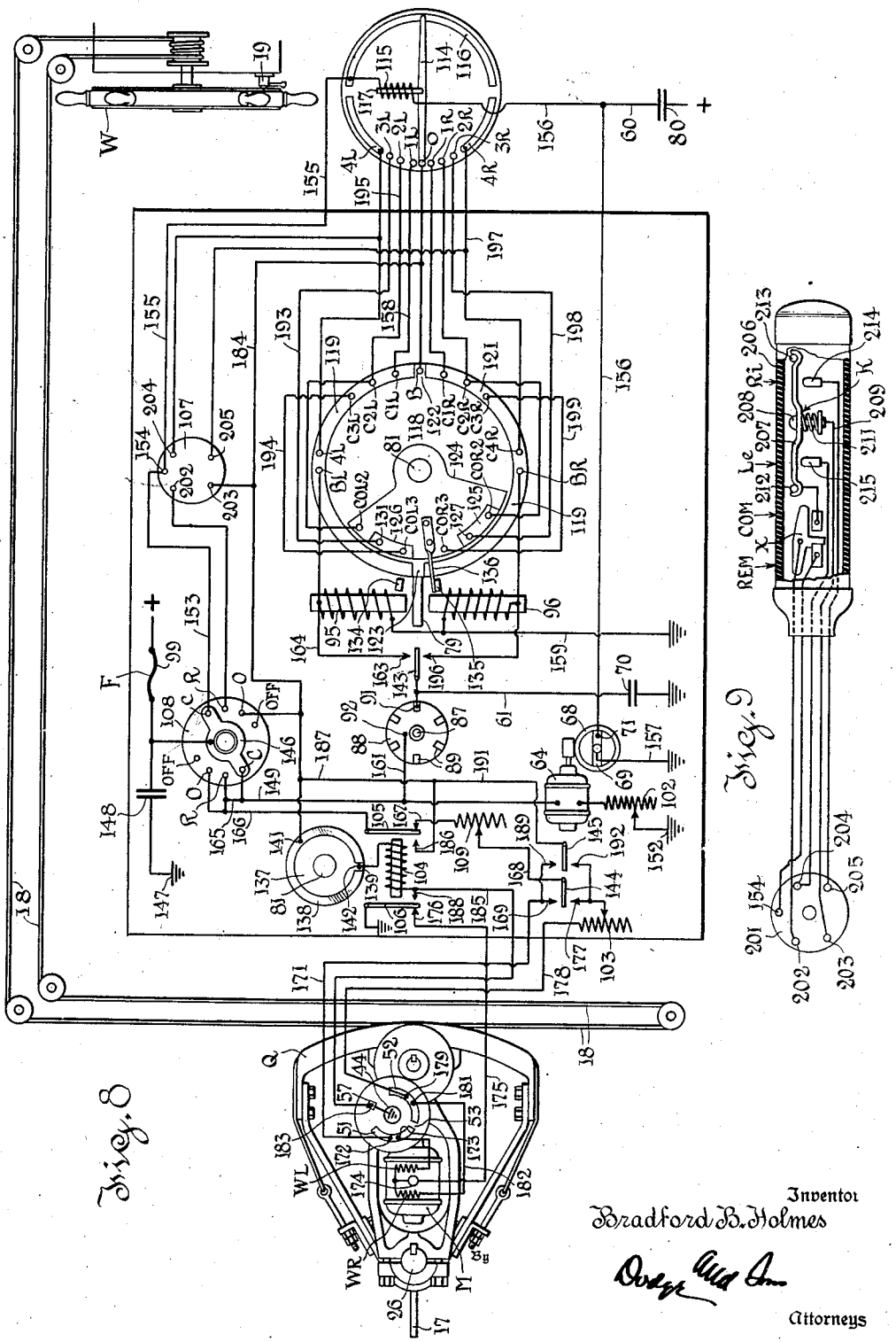

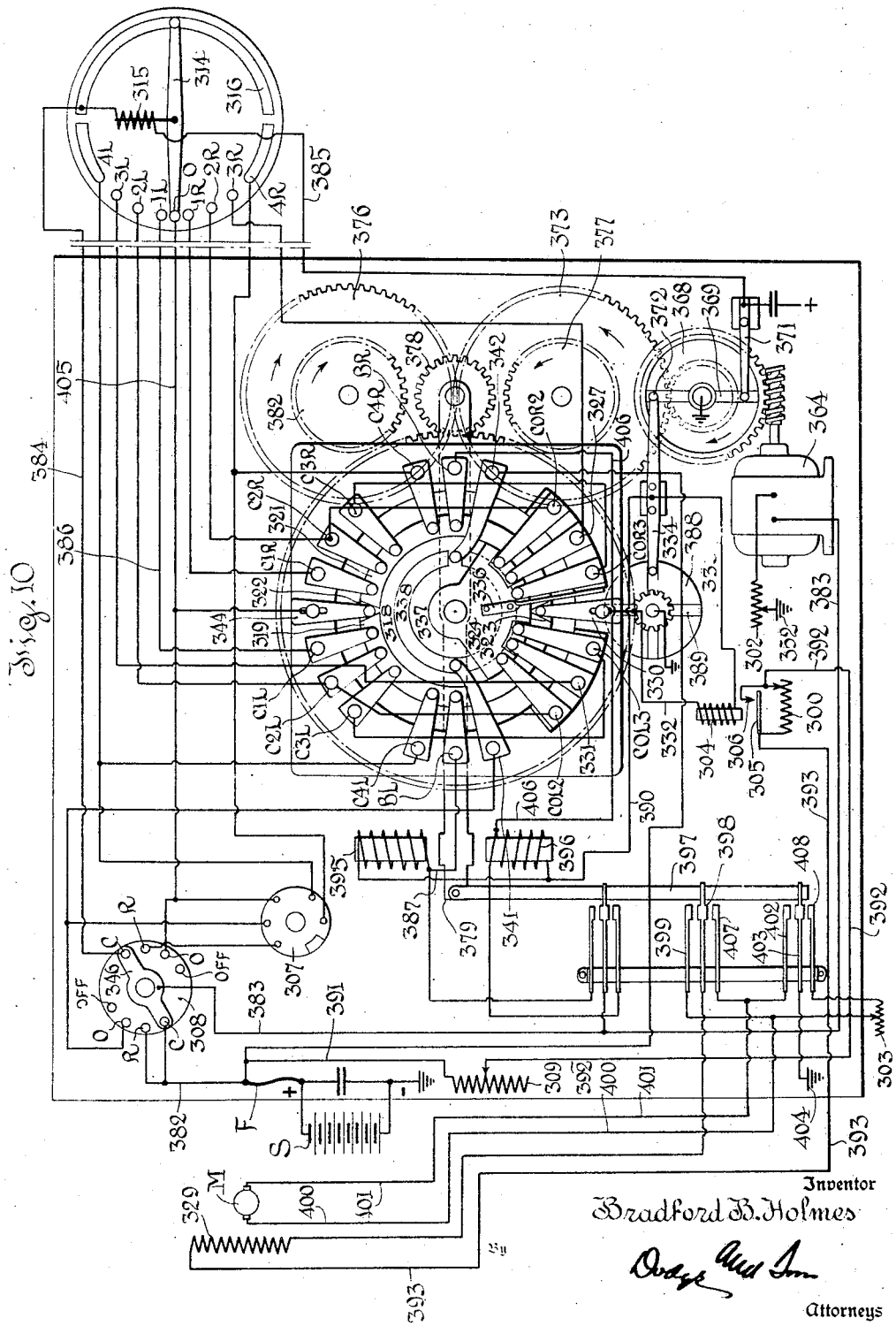

Patented Oct. 5, 1937

2,095,031

UNITED STATES PATENT OFFICE 2,095,031

AUTOMATIC STEERING SYSTEM FOR DIRIGIBLE CRAFT

Bradford B. Holmes, Stonington, Conn., assignor to Ruth V. Holmes, Stonington, Conn.

Application February 9, 1934, Serial No. 710,553

64 Claims. (Cl. 114—144)

This invention relates to automatic steering systems for dirigible craft. The system is capable of adaptation to the control of airships or other rudder directed aircraft as well as marine craft.

It relates specifically to a remote control arrangement to be placed at the control station of the craft and to operate a steering motor directly connected to the rudder in the stern of the craft or to operate the power steering gear of a ship. In both uses mentioned, the steering motor or other steering device to be controlled is located at the stern of the craft and the controlling mechanism in the pilot house or other steering station, usually well forward on the craft and at a considerable distance from the rudder.

The main object of this invention is to eliminate the usual follow-up system of control in which the rudder position is governed by a two-part controller in which one part is mechanically connected to the rudder, and the other operatively connected to the compass of the craft. Such a controller must either be mounted on the steering gear, or, if in the pilot house, the hand steering mechanism must serve as a connecting link between the controller and rudder. When the controller is mounted on the steering gear, it is not readily accessible for inspection and repair, since in many craft the lazaret is in an unfavorable location for access and is often dark, damp, and dirty. All of these conditions are unsuited to the housing of a complicated electrical control.

When the two-part controller is located in the pilot house, backlash is always present between the rudder and controller, because of slack cables, worn mechanical parts, leaky telemotors, or the like. Furthermore, the backlash varies in amount from time to time and thus introduces serious and variable errors in steering. This backlash is usually compensated by the use of lost motion, and this is a clumsy expedient.

In a follow-up system of control, adjusting the helm between minimum and maximum conditions requires a complicated mechanical arrangement for varying gear or lever ratios, or for shifting contacts. A resistance can be used in series with the motor to change the rate of rudder movement, but not the angle through which it is moved since the latter is determined by the controller.

In view of the disadvantages incident to the use of a follow-up system, it is proposed in this invention to employ a controller operated by mechanism the position of which does not depend upon the position of the rudder. The controller operates the steering motor for a definite time period, hence a resistance in series with the steering motor can be used to change the angle of rudder movement, and this resistance affords a simple means of solving the heretofore difficult problem of helm adjustment. The steering, therefore, may be carried out either directly at the rudder or at the valve or other device which controls the steering engine, thus positively and permanently eliminating all backlash in the system and avoiding all errors incident thereto. Furthermore, all of the electrical control equipment involved in moving the rudder and susceptible of adjustment is located at the steering station so as to be accessible readily for inspection, adjustment, or repair.

The advantages of this system in which the steering is done directly at the rudder or at the steering engine, and in which the electrical control mechanism is segregated at the steering station are outstanding and result in materially simplifying the wiring, installation, and servicing of electrical steering systems. The elimination of a follow-up connection between the rudder and controller makes it possible to locate the parts in the most favorable and accessible positions and to maintain more exact synchronism between the rudder and controller than in follow-up systems having backlash. The electrical circuits may be simplified and arranged so that the control parts can be connected to or disconnected from the system by "plug-in" connection to a cable, thus simplifying installation, servicing, and maintenance and permitting the quick substitution of spare units at any time. The location of the controller at the steering station makes it possible to use it as a rudder position indicator.

Concisely stated, other objects and advantages in addition to those mentioned above are the provision of a system in which a simple variable resistance may be employed to control the amount of helm; the provision of a system in which easy access may be had to all controlling parts requiring attention or adjustment; and the location and arrangement of all units of the system to permit their ready and convenient replacement.

Other objects and advantages of systems embodying my invention will be apparent from the following description when read in connection with the accompanying drawings, in which:—

Fig. 1 is a plan view of a complete automatic steering system embodying my invention and showing the arrangement and location of the separable units;

Fig. 2 is a detailed plan view of one form of quadrant and steering engine suitable for use in systems embodying the invention, the quadrant being shown directly connected to the rudder of the craft;

Fig. 3 is a view in elevation of the quadrant shown in Fig. 2, with certain parts in section, and with the steering cables and rudder post omitted;

Fig. 4 is a plan view of a contact device operated by movement of the tiller, the cover being removed to show the interior;

Fig. 5 is a section on line V—V of Fig. 4, and showing the means for actuating the contact device;

Fig. 6 is a plan view of the control mechanism mounted within a control box, with the cover open to show the arrangement of the various parts;

Fig. 7 is a view of the control box with the controller removed to show the operating parts more clearly;

Fig. 8 is a diagrammatic view of the preferred form of automatic steering system embodying this invention and showing the electric circuits;

Fig. 9 is a side view, partly in section, of a portable remote control switch suitable for use with steering systems embodying this invention;

Fig. 10 is a circuit diagram of a modified system with the mechanical parts of a modified controller also shown;

Fig. 11 is an illustrated diagram for the purpose of defining the rudder positions discussed in the specification; and Fig. 12 is a partial plan view showing the invention applied to a double rudder steering system.

In steering systems wherein a follow-up connection is used, the parts are so arranged that the steering motor stops after the rudder has turned through a definite predetermined angle. In systems embodying this invention, on the contrary, it is proposed to run the steering motor for a definite and predetermined time and without regard for the angle through which the rudder is turned. The reason for operating the rudder in this manner is based upon the following facts which have been discovered after prolonged experimentation.

If a craft be provided with a reversible motor for actuating the rudder, and mechanism be provided in the form of suitable gearing to oscillate the rudder for definite and predetermined intervals of time, it will be found that neglecting electrical and frictional irregularities the rudder will tend to move so that its center of oscillation will coincide with the free trailing position of the rudder and to be maintained in that position. By free trailing rudder position is meant that position which the rudder would assume if allowed to move freely with the boat moving through the water in the direction of the keel line. The reason why the rudder seeks a center of oscillation coinciding with the free trailing rudder position is that the rudder in moving away from the trailing position when the craft is under way encounters greater water resistance than when it is moving toward the trailing position and this causes a slowing up of the motor when rudder is being put on. However, the free trailing position of the rudder is very rarely the rudder position which holds the boat to a course. Not only will the physical characteristics of the craft itself, such as hull irregularities, and more particularly propeller drift in a single screw craft, cause the boat to drift off its course and turn in a large circle, but a similar influence will be brought about by the elements, such as wind and waves.

The above exposition will be understood better by reference to Fig. 11 of the drawings, wherein the reference character 15 designates the hull of a craft with the center or keel line designated 16. If the boat is moving forward through the water and the rudder 17 is free to trail, the boat will tend to turn in a large circle. Thus the rudder will tend to assume a position to one side of the keel line, such as position T. Under the conditions assumed, the neutral position of the rudder in which the craft would maintain its course would be one in which the rudder was held in the position N. Consequently, in order to accomplish accurate steering, compensation must be made not only for the imperfections in the boat itself, which are of fixed character, but also the varying outside influences which are incidental to the action of the elements. These fixed influences may be counter-balanced by biasing the rudder toward its neutral position by a spring, but better still by providing an electric biasing resistance so connected in the circuit of a steering motor as to slow down that motor slightly when rudder is being applied in the direction in which the craft inherently tends to turn.

Of the influences tending to cause a craft to move off its course the most important among those above enumerated is the propeller drift. This influence may be accurately balanced out by including a proper resistance in the steering motor circuit as just stated. The action of the motor with such a resistance is to cause the trailing rudder position to coincide very closely with the neutral position of the rudder for normal cruising speeds of the craft.

Having provided means for balancing out the inherent tendencies of the craft to deviate from its course by the means above described, it is next necessary for accurate steering that the rudder and controller be synchronized properly. This synchronization is a vital factor and may be carried out in several ways. Two methods of bringing about this synchronization will now be described.

The first method consists in establishing a definite center rudder position in the quadrant. The rudder occupies this position when the craft is on its course and returns to it when the craft returns to its course after deviation. This center may be called the center of oscillation of the rudder. Synchronization between the rudder and controller is then assured by providing a tendency to take off more rudder than is put on, and by stopping the rudder on its return at a definite center position in the quadrant.

Means are provided for manually setting the rudder at the center of oscillation, and for moving the controller to its zero position corresponding to the center rudder position should an accident cause the two to get out of phase. Means are provided in the system to maintain the rudder center of oscillation and the controller zero position in phase after their initial adjustment. This position of the center of oscillation may be changed by varying the position of the quadrant manually to make its position consistent with navigating conditions. This position of the center of oscillation must obviously be readjusted whenever changes in the action of the elements, such as wind, causes material variation in the course tending to deflect the craft from a set course.

In the second method of causing synchronization between the rudder and controller, no fixed center of oscillation of the rudder is established in the quadrant. The circuits are, however, so arranged as to give the steering motor a tendency to overthrow the rudder in all movements away from the set course, so that the rudder will automatically seek and maintain the neutral position. This provides a flexible and automatic synchronization of the rudder and controller and causes the shift to take place so as to balance out changes in the deflecting forces acting on the craft, without requiring any adjustment of the position of the quadrant.

The first method in which the center of oscillation is definitely fixed in the center of the quadrant, and the quadrant set manually to a position to maintain the craft on her course, is very exact and provides accurate and stable steering in rough weather on craft where the automatic steering mechanism acts directly on the rudder. However, when the system is applied to craft on which the automatic mechanism acts on the valve of a steering engine and, hence, the water pressure on the rudder is not a factor, the second method provides stable steering and has the advantage that the rudder seeks and maintains a neutral position automatically and changes the position accurately as navigating conditions change.

In both of the methods of synchronizing discussed above, the apparatus employed is substantially the same, but the electrical hook-up varies in accordance with the operation desired.

Before describing the operation of the electrical circuits for carrying out the above methods, the mechanical elements of the system which are common to both methods will be described.

Referring first to Fig. 1, the system therein shown includes a steering quadrant Q, a steering motor M carried by the tiller 31 connected to the rudder 17 and adapted to be moved by a steering wheel W. The wheel is connected to the quadrant Q by the usual steering cables 18 and may be held in predetermined position by a brake 19. The system also includes a magnetic compass 21 having electrical contact apparatus associated with it and a control unit C connected both to the compass and to the steering motor through electrical cables provided with plug and socket connections. Electrical energy is supplied to the system from any suitable source of current here shown as a battery S. An electric cable 22 connects the compass 21 with the control unit C through a plug 23. A cable 24 having a plug at each end connects the control unit with the motor M. In similar manner, a cable 25 connects the source of current S with the control unit C by still another plug-in connection.

In this description the system will be shown with the control applied directly to the rudder, but it is to be understood that if the system is applied to a craft in which the automatic control acts on the valve of a steering engine, the tiller will be connected to the control valve instead of to the rudder post, as shown.

In describing the steering motor unit made up of a quadrant and steering motor carried by it, reference may be had to Figs. 2 and 3, in which the reference character 26 designates the rudder post connected to the rudder 17 and carrying the quadrant Q. The steering quadrant comprises a tiller rigidly clamped to the rudder post, a quadrant journaled about the rudder post clamp and operatively connected to and positionally located by the manual steering system. Power operating means between tiller and quadrant are supplied by a reversible electric motor with suitable worm and spur gearing which is self-locking when not in operation.

The tiller comprises the casting 31 and is secured to the rudder post 26 by clamp 28 and bolts 32. The clamp 28 is shaped to cooperate with rudder posts of varying shapes. Depending from tiller 31 is a quadrant supporting plate 34 bolted to tiller 31 at 50. Plate 43 is cast integral with tiller 31 and supports the motor.

The quadrant comprises the casting 38 fitted with cable slots 41 and secured to the arms 27 of the body 29 by bolts 33. Body 29 is movable about the rudder post. Lugs 36 are integral with the arms 27 and, together with eye-bolts 37, form an adjustable anchorage for the steering cables 18.

The above described parts are bolted together in such a way that the steering quadrant can be quickly disassembled to permit it to be passed through a small manhole or deck plate, often the only entrance to the lazaret.

Secured to the tiller 31 is a reversible motor M which includes a worm, worm gear, and shaft 44 in the housing 42. The output of the motor is delivered by shaft 44 at a speed reduction of about 60:1 from the motor armature. Keyed to shaft 44 is a spur gear 45 which meshes with spur gear 46 keyed to shaft 47. Shaft 47 is journaled in bearing 48, which is an integral part of tiller 31. On the other end of shaft 47 is keyed gear 49 which meshes with teeth 39 cast in the quadrant casting 38. Thus, when the motor M is in operation, the tiller is caused to move inside the quadrant by the above described gear train.

Gears 45 and 46 are "change gears" of a series, so that they offer a ready means of changing the gear ratio between motor and rudder to roughly fit the steering requirements of the craft. When the motor is not operating, the quadrant and tiller are locked by the self-locking worm, and the tiller then moves in concert with the quadrant.

Relative movement between the quadrant and tiller is utilized to operate limit switches. These switches serve solely as a safety means to prevent the gear 49 from running off the teeth 39 during extreme movements of the tiller. This same movement is also utilized to operate the centering switch whereby the steering motor is deenergized when the tiller reaches a fixed point in the quadrant.

The structure shown in Figs. 2-5 comprises an insulating disc 54 secured to shaft 62 journaled in tiller 31. A gear sector 60 carried by quadrant body 29 drives shaft 62 through gear 61. The disc 54 carries two conducting segments 51 and 52 spaced at 53 and cooperating with pairs of brushes 172, 173 and 179, 181, respectively. The disc also contains a grounded conducting contact 57 cooperating with a narrow brush 183.

All of these brushes are carried by an insulating tube 55 closed by a cover 56 and bolted to the tiller. Extreme movement of the tiller beyond the steering range carries one of the segments 51 or 52 beyond its cooperating brushes, but always maintains contact between the other segment and its cooperating brushes to energize the steering motor in such a direction as to move the tiller toward the center of the quadrant. This effectively prevents gear 49 from running off the teeth 39.

The control unit will now be described with reference to the showing of Figs. 6 and 7. Since this unit is to be located adjacent the steering station and is to be accessible for inspection, it is preferably mounted in a box and fastened on the instrument panel of the craft. While such a location is not compulsory, it is convenient and in the present specification it will be assumed that such a location is chosen. The box 63 has mounted within it a pilot motor 64 mounted in the bottom thereof and having on its shaft a worm 65 through which drive is imparted to worm wheel 66. On the shaft 67 which carries this worm wheel is mounted an insulating disc 68 having a grounded transverse conducting portion 69 cooperating with a stationary brush 71 designed to control the energization of the lift mechanism of the compass contact arm later to be described, the circuit controlled by this brush and section being energized twice for each revolution of the disc 68.

On the shaft 67 below the worm wheel 66 is a pinion 72 in constant driving relation with a gear 73 carried on shaft 74. Mounted on shaft 75 is a gear 76 similar to the gear 73 and in constant mesh with it. Consequently, rotation of the worm wheel 66 causes rotation of the gears 73 and 76 in opposite directions. The shaft 74 carries a small pinion 77 adapted to at times cooperate with a similar pinion 78 mounted on the free end of arm 79 which is pivoted at 81 about which it makes limited rotative movement.

The shaft 75 carries a pinion 82 similar in size and character to the pinion 77 on shaft 74 and also adapted at times to cooperate with the pinion 78. The pinion 78 is carried by a pin 83 in the free end of arm 79 so that, when pinion 78 is brought into engagement with either of the pinions 77 or 82, pinion 78 is caused to rotate in one direction or the other. A smaller pinion 84 is secured to pinion 78 and is constantly in mesh with a large gear 85 rotatable about the pivot 81 and in mesh with a small gear 86 rotatable about post or pin 87. The gear 86 also has secured to it a conducting disc 88 containing six evenly spaced insulating segments 89 cooperating with brush 91. Brush 92 rests on the conducting surface of disc 88 and does not register with the insulated segments 89. These brushes contact electric circuits to cause step-by-step energization of a circuit later to be described.

The operation of disc 88 is so timed with respect to that of timer 68 that their circuit-closing periods overlap. Consequently, when the craft makes large swings, the steering motor circuit remains closed throughout a swing back to the set course. This avoids the wear of parts as well as the loss of time and power incurred in starting and stopping the steering motor several times.

The end of arm 79 to the left of pivot 81 has an extension upon which are mounted two magnetic armatures 93 and 94 cooperating with electromagnets 95 and 96. Connected to the free end of the arm 79 is an insulated link 97 adapted to operate circuit controlling contacts of a three-pole double throw switch and to control the circuits in a manner later to be described. At present it will be sufficient to state that as long as both of the electromagnets 95 and 96 are deenergized and motor 64 is rotating the pinions 82 and 77, they are driven at constant speed in opposite directions. When one of the electromagnets, for example 95, is energized, the arm 79 is rotated in a clockwise direction to bring pinion 78 into mesh with pinion 77 and thus complete a driving connection to the small pinion 84, large gear 85, and drive the conducting disc 88. In similar manner, energization of the electromagnet 96 rotates the arm 79 in a counterclockwise direction and establishes a driving connection between pinions 78 and 82, thus driving the gear 85 and the associated parts in a direction contrary to that which it had when electromagnet 95 was energized. The pilot motor 64 runs at constant speed at all times during the operation of the system and is at all times ready to impart movement to the gear 85 and the parts which it drives in a direction and at a time which is determined by the operation of the circuits which control electromagnets 95 and 96.

Fig. 6 shows some of the parts already described in connection with Fig. 7, but, in addition thereto, the controller which is mounted on the top of gear 85 and which controls the operation of the entire steering system. An insulating plate 98 mounted within the box 63 and above the gearing just described carries a plurality of electrical conducting brushes mounted thereon and cooperating with controller discs on the shaft 81. The arrangement of these brushes in connection with certain conducting segments of the rotatable discs is such as to bring about proper operation of the steering engine in response to the indications of the magnetic compass. The details of the brushes and their cooperating control segments will be set forth when the circuits are traced.

Mounted on the insulating plate 98 is an electric fuse 99 for protecting the circuits. The inside of cover 101 of box 63 carries a pilot motor speed controlling resistor 102 and a balancing resistor 103 for imparting a compensating characteristic to the steering motor. Also mounted in this cover are a plurality of condensers which are shunted around appropriate electrical contacts to eliminate sparking and to minimize radio interference when the steering mechanism is operating. The cover 101 also carries a relay 104 having two contact arms 105 and 106 for controlling circuits to be described later, a socket 107 into which a remote control attachment later to be described is inserted, a main switch 108, an adjustable steering motor resistance 109, and a window 111 through which a rudder indicator carried by shaft 81 is visible. This indicator comprises a disc 112 having a distinctive colored line 113 extending across it. By properly calibrating the position of this line, it will give a qualitative indication of the direction of the rudder by its relation to the opening 111, since the controller must at all times remain synchronized with respect to the rudder.

From an inspection of Fig. 1 it will be clear that the control unit is entirely housed within the box 63, the only elements projecting therefrom being the handles of the main switch 108 and resistance 109. One side of the box 63 contains sockets into which the plugs of the compass, the source of current, and the motor cable may be inserted.

This system while capable of being operated from any type of direct control direction indicating element will be described herein as being controlled by a magnetic compass, more particularly an electric contact arrangement magnetically coupled with the compass as set forth in my copending application Serial No. 641,275, filed November 4, 1932, to which reference may be had for a full disclosure of details. For the purpose of this application it will be sufficient to state that the electric contact arrangement is removable from the compass and comprises a rotatable electric contact arm magnetically coupled to the moving element of the compass but out of mechanical engagement with it at all times. A solenoid is periodically energized to lift the contact arm so that its two ends engage contacts carried by a ring above the arm in which ring are embedded electric contacts for completing circuits as the contacts are engaged by the arm.

As shown in Fig. 8 of the drawings, the compass needle is omitted, but it will be understood that it is magnetically coupled to the contact arm 114. This arm is periodically lifted by energization of a solenoid 115 acting on a magnetic core 117 connected to arm 114 to bring the ends of the arm 114 into contact with conducting segments at either end of this arm. Deenergization of the solenoid causes the contact arm to drop by gravity away from the contacts.

As shown, the compass carries a center or zero contact with which the arm 114 is in engagement. It also carries four right contacts 1R, 2R, 3R, 4R, 4R being of substantial arcuate extent, and a similar set of contacts 1L, 2L, 3L, 4L. Completion of the solenoid energizing circuit is assured by a conducting segment 116 which cooperates with the end of contact arm 114 remote from the contacts just described.

The form of the invention shown in Fig. 8 is that which has been found to possess the most stability in rough weather, and particularly when the system is applied to a craft in which the control is effected by a direct connection to the rudder as shown. This system is of the type in which the quadrant is set manually in order to fix the center of oscillation of the rudder with respect to the center line of the craft. It also is shown to include a balancing resistor in circuit with the reversible direct current steering motor when the motor turns in a direction to move the rudder in the direction in which the boat has an inherent tendency to turn, thus balancing out the inherent tendency of the craft to turn away from the set course.

Before tracing the circuits and describing the operation of the circuit shown in Fig. 8, certain details of the controller, mechanical parts of which are shown in Figs. 6 and 7, will be described. Mounted on the shaft 81 and rotatable with it is an insulating disc 118 carrying two arcuate conducting segments 119 and 121 diametrically related and spaced apart at 122 and 123. Mounted around and cooperating with the arcuate segments 119 and 121 are a series of brushes which will be designated as far as possible by the reference character identifying them with respect to the compass control contacts with which they cooperate. When the disc 118 occupies its zero position, the insulating gap 122 is in alignment with zero brush B of the controller. In this position there are, contacting with the segment 119, a plurality of controller brushes C1L, C2L, C3L, C4L, and BL, controlling left rudder movements. Associated with the conducting segment 121 are similar brushes C1R, C2R, C3R, C4R, and BR, controlling right rudder movements.

Also mounted on the shaft 81, above the disc 118, and frictionally held thereon, is a change-over switch, comprising an insulating sector 124 having conducting inserts 125 and 126. Cooperating with the segment 125 are three brushes 127, COR2 and COR3, and cooperating similarly with segment 126 are brushes 131, COL2 and COL3. The sector 124 is capable of limited movement, its distance of travel being determined by engagement of an arm 136 with either of two stops 134 and 135 on the plate 98 (see Fig. 6).

Also fixed to the shaft 81 is another insulating disc 137 carrying a split conducting ring 138 having its ends separated by an insulating section 139. Cooperating with the ring 138 are brushes 141 and 142 which are included in circuit with a relay 104, which relay operates to control the motor switch. This relay has an armature with two arms 105 and 106 which cooperate with contacts, the functions of which will be described in detail when the circuits which they control are traced. These arms are biased to the positions shown, the arm 106, therefore, closing the armature circuit of the reversible steering motor, and the arm 105 closing the circuit through the steering motor variable resistance 109 which serves for helm adjustment.

The arm 79 controls through link 97 the position of the three pole switch which includes the switch arms 143, 144, and 145, the mechanical details of which are indicated clearly in Figs. 6 and 7. It will be understood that, when both of the magnets 95 and 96 are deenergized, the switch arms 143, 144, and 145 occupy the mid position shown and that their up or down movement is coincident with the up or down movement of the arm 79. The force exerted by these switch arms is sufficient to hold the arm 79 in a mid position between the two electromagnets 95 and 96 when the magnets are both deenergized.

As herein shown, the system obtains its energy from a direct current source S, the positive pole of which is indicated in Fig. 8 as supplying energy through a fuse F to the switch arm 146 of the main switch 108. This contact is grounded at 147 through a condenser 148 which is employed to prevent sparking of contacts when the circuits are opened. The switch 108 has four positions, namely, an "off" position, a "zero" position to cause centering of the rudder with respect to its quadrant when hand steering is to be carried on or before the circuits are deenergized by moving the switch to "off" position, an "R" position for use when the remote control device is to be included in the circuit, and a "C" position when the control of the mechanism is to be carried out by the compass.

The system shown in Fig. 8 of the drawings has a steering motor M of the double field reversible type having two windings WL and WR under the control of the controller. The controller is in turn driven by the pilot motor 64 and has the energization of its contacts controlled by the position of the contact arm 114 associated with the compass on the craft. It will be understood that any other suitable type of reversible motor may be employed in place of that shown, and that it is not essential that the motor be of the double field type.

As long as the switch arm 146 occupies the "off" position, all of the circuits of the system are deenergized and the parts occupy the positions shown in the drawings. If the switch be moved to engagement with the contacts C, the apparatus will be rendered operative and the pilot motor 64 will be energized over the circuit from the positive terminal of the source, through fuse F, contact arm 146, contact C, wire 149, windings of the motor 64, pilot motor resistance 102, and ground at 152. Completion of this circuit causes the motor to operate at constant speed and continuously in accordance with the adjustment of the variable resistance 102. By its rotation this motor drives the timer 68 to cause periodic energization of the solenoid 115 controlling the compass contact head, the timer circuit being compuleted twice for each complete revolution of the timer.

The circuit for the solenoid 115 controlled by the timer is from the positive terminal of the source through fuse F, contact arm 146, contact C, wire 153, contact 154 on remote control plug 107, wire 155, solenoid 115, wire 156, brush 71 of timer 68, conducting segment 69, wire 157, to ground. As long as this solenoid circuit is closed, the contact arm 114 is held in engagement with the conducting segment 116 and the zero contact or one of the L or R contacts opposite it, thus to control energization of certain circuits of the controller.

It will be understood that as long as the craft holds its course and the contact arm 114 of the compass remains in alignment with its zero contact, the other parts of the system will not move from the position shown, except that timer 68 will continue to rotate. If, however, the craft departs from its course slightly, so as to cause contact arm 114 when lifted to engage a contact such as contact IL, this action will cause the magnet 95 to be energized and thus to swing the arm 79 sufficiently to bring pinions 78 and 77 into engagement with one another and thus to rotate the parts of the controller. The disc 88 will also rotate and will maintain energization of the steering motor by keeping the magnets 95 and 96 energized when compass contact arm 114 is down.

When contact arm 114 engages contact IL, the circuit is closed from positive terminal of the source, through fuse F, contact arm 146, wire 153, remote control contact 154, wire 155, compass head conducting segment 116, contact arm 114, contact IL, wire 158 to contact CIL of the controller, conducting segment 119 of the controller, brush BL, winding of electromagnet 95, and wire 159 to ground.

Movement of the armature carried by the end of arm 79 will cause the contact arms 143, 144, and 145 to be moved upwardly and thus to close two circuits. The first circuit is that of the disc 88 which is provided to maintain the solenoid 115 energized while timer disc 68 breaks and reestablishes the solenoid circuit at periodic intervals.

The circuit controlled by the disc 88, under the conditions just outlined, is from positive terminal of the source, through fuse F, switch arm 146, contact C, wires 149, 161, brush 92, disc 88, brush 91, switch arm 143, contact 163, wire 164, winding of magnet 95, wire 159, to ground. This circuit is interrupted every sixth revolution of the disc, but these interruptions are staggered with relation to interruption of the solenoid circuit occasioned by rotation of timer 68 so that the electromagnet 95 is held energized until the controller moves to a position in which insulating segment 122 coincides with the position of one of the controller brushes which has been selected by the compass contact arm.

When the switch arm 144 is lifted simultaneously with the lifting of switch arm 143, the steering motor M is energized to give the rudder a movement to the left. The circuit for the steering motor controlled by switch arm 144 is from the positive terminal of the source, through fuse F, switch arm 146, contact C, wires 165 and 166, relay arm 105, relay contact 167, steering motor variable resistance 109, wire 168, switch arm 144, switch contact 169, wire 171, limit switch contacts 172 and 173, conducting segment 51, field winding WL of steering motor M, armature 174 of that motor, wire 175, contact 176, arm 106 of relay 104, to ground. This causes the rudder to be moved to the left until corresponding movement of the controller brings the insulating segment 122 of that controller into alignment with the brush selected by the positioning of compass contact arm 114.

It should be noted that the purpose of the limit switches carried by the tiller 31 is to prevent the gear 49 from running off the teeth 39 in either direction under extraordinary conditions. Consequently, in one extreme position of gear 49, one of the limit switches is opened to prevent further movement in that direction, but the other switch is closed, so that the motor may be energized to move the gear 49 in a direction to maintain it on the track. The limit switch has no function in normal steering. It is set to act considerably beyond the range of rudder determined by the controller and is purely a safety measure to stop the motor if some failure occurs in the controller circuits.

The purpose of the relay 104 is to stop the steering motor at a fixed center position in the quadrant when taking off rudder at such times as the rudder may reach the center position before the controller has reached its center position. As has been stated, the rudder has a tendency to underthrow when putting on rudder, due to water resistance on the rudder. It, therefore, tends to return to center very slightly before the controller reaches its center. The relay provides a means for stopping the rudder at zero and prevents any displacement between rudder and controller which would occur if the rudder passed through the zero position on its return. The arrangement is such that the relay 104 can only be energized when taking off rudder and never when putting it on. This is brought about by making the terminal which supplies current to the relay negative and thus of ground potential when rudder is being put on, and making that contact of positive potential when rudder is being taken off, so that the relay can be energized.

As long as the compass contact IL is hit by the contact arm 114, the rudder is maintained in the position to which it was moved, and the steering motor and magnet 95 are deenergized by the insulating section 122 of the controller disc 118 moving into coincidence with brush CIL, thereby interrupting the circuit from the positive terminal of the source. Deenergization of this circuit causes the arm 79 to be restored to the mid position by action of spring contact arms 143, 144, and 145, thus breaking the steering motor circuit at 169.

As soon as the craft commences to swing back to its course in response to the left rudder movement and the action is such as to cause contact arm 114 to engage the zero compass contact, the controller circuits will be energized to complete the energization of right electromagnet 96, thus closing the contacts 143, 144, and 145 by moving them to the down position. In this position the arm 144 engages contact 177 to complete the circuit to the steering motor through the limit switch, which includes contact segment 52, winding WR of the steering motor, and the balancing resistor 103. Consequently, the rudder is moved toward the right.

The complete circuit for the steering motor, under these conditions, is from the positive terminal of the source, through fuse F, switch arm 146, contact C, wires 165 and 166, relay arm 105, relay contact 167, variable resistance 109, wire 168, switch arm 144, contact 177, balancing resistor 103, wire 178, brushes 179 and 181, limit switch associated with segment 52, wire 182, motor field winding WR, motor armature 174, wire 175, relay contact 176, and relay arm 106, to ground.

As indicated before, there is included in the drive between the tiller and the quadrant a centering contact 57. Cooperating with this contact is a brush 183 which completes a circuit to ground whenever the tiller occupies the predetermined chosen center position with respect to the quadrant. The purpose of providing this centering contact is to maintain synchronization between the rudder and the controller, that is, to stop the steering motor whenever rudder is being taken off, if the rudder should tend to pass through the center position before the controller stops at its zero or center position.

After the rudder has stopped at its center position, the controller continues its travel to its zero or center position, which movement was initiated by the compass. When the rudder has been moved away from its zero position and the parts are energized to restore it, the controller disc 118 is, of course, displaced from the position shown in Fig. 8. Likewise, the position of controller disc 137 is such that both of the brushes 141 and 142 contact with the conducting ring 138.

As pointed out, as long as the rudder is being put on or is moving away from its neutral position, the relay 104 cannot be energized. However, when the rudder is moving toward its neutral position, positive current is supplied to the conducting ring 138 so as to energize the relay 104 as soon as the tiller reaches a position where brush 183 engages the conducting segment 57. If at this time the controller is restored to its zero position simultaneously with the engagement of brush 183 and contact 57, the relay 104 is never energized, since the brush 142 engages the insulating segment 139 of controller disc 137. However, should, for any reason, the controller be out of exact synchronism with the rudder, and not be restored to its zero position at the time when the rudder reaches its neutral position, the relay 104 will be energized to break the contact between relay armature 106 and contact 176, thus deenergizing and stopping the steering motor.

This circuit for relay 104 will be as follows: Positive terminal of the source, fuse F, switch arm 146, compass contact C, wire 153, remote control contact 154, wire 155, compass segment 116, contact arm 114, compass zero contact, wire 184, controller brush 141, conducting ring 138, brush 142, winding of relay 104, wire 185, brush 183, conducting segment 57, to ground.

After the arm 114 has dropped, the zero controller contact remains energized through the circuit established by disc 88 and switch 143, as already explained, so that at any time when rudder is being taken off and brush 183 engages segment 57, the relay operates, breaking the motor circuit.

Contact 183 and segment 57 are made of as small angular extent as possible. In some cases, after the relay has been closed to stop the motor, the inertia of the motor armature may cause the motor to coast enough to break the circuit at 183—57. To prevent the relay 104 from opening before the controller breaks the circuit at 139—142, a holding circuit is established as follows: Positive terminal of source over compass contact 114, zero compass contact and wire 184, brushes 141, 142, segment 138, relay winding 104, contact 188 on relay, relay arm 106, to ground. This holds the relay circuit closed, after it has been closed at 183—57, until the circuit is broken at 139—142 when the controller reaches its zero position.

This insures synchronization of the controller and rudder at all times and renders the synchronization accurate and positive. In normal operation of the system, the synchronization is maintained so perfectly that the relay 104 is energized only at comparatively infrequent intervals. Under normal conditions the brush 183 will strike the conducting segment 57 simultaneously with the engagement between controller brush 142 and gap 139. Any disparity between these points of circuit control is usually brought about by the slight tendency of the steering motor to return to center before the controller reaches its zero position. The provision of the circuits just described insures that controller and rudder remain accurately synchronized at all times, in spite of any deviations of the character recited. The synchronization is very exact and its exactness approaches infinity as the size of the contacts approaches zero as a limit.

It has been found that non-cumulative rudder impulses are very effective to produce stable steering in calm water. Consequently it is found preferable in systems of this character to move the rudder away from zero when the craft is near its course and then to return it to center in a series of small, equal, non-cumulative swings or impulses. When the craft is farther from its course, however, it is preferable to hold the rudder deflected, particularly in heavy weather, or in changing course, so as to avoid a waste of power incident to returning the rudder to its mid position between successive deflections.

Consequently, in the system shown in Fig. 8, whenever the compass contact engages either the IL or IR contact and simultaneously the zero compass contact, alternate deflection and restoration of rudder occur.

As has been stated, synchronization is accomplished by creating a slight tendency to take off more rudder than is put on, and then stopping the steering motor when the rudder is at center to prevent it passing through the center position. When necessary, a balancing resistance 103 is added to one side of the motor circuit to bring the free trailing position of the rudder to the neutral position. In practice it is usually only necessary to use the resistance 103 on boats with large slow single propellers which have a severe deflecting action.

The means used to give the underthrow tendency has been provided by water resistance on the rudder. However, on ships where the quadrant is used to control the valve of an engine, some additional means must be employed as water pressure is not available. Switch arm 145 is used for this purpose and its circuits include wires 187 and 191, and contacts 189, 192.

As has been stated, whenever rudder is being taken off, the zero controller contact is on a positive segment, and when rudder is being put on, this contact is on a negative segment. Switch arm 145 is connected to the WL or WR fields of the motor by one of contacts 189 or 192. It is also connected to the controller brush B by wires 191, 187, 184. Thus, when rudder is taken off, wires 184, 187, 191 carry current from the zero contact to 145, short circuiting resistance 109 which causes the motor to run slightly faster in taking off rudder. When the rudder reaches center and the relay acts, the armature circuit is broken by relay arm 106, thus stopping the motor. Switch 145, 189, 192 is not connected up or used when the quadrant is used to turn a rudder, but only when it is used to turn a valve or to act as a servomotor.

In the preceding description, the various circuits have been traced describing the operation of the mechanism when the compass contact arm engages the zero contact, as well as contact IL. It will be understood that the operation of the circuits when this arm engages contact IR is the same as that for contact IL, except that the parts move in directions opposite to those described. This means that the electromagnet 96 is energized and that the controller and the steering motor move to the right; likewise, that spring switch arms 143, 144, and 145 are all moved downwardly instead of upwardly.

Before describing the operation of the change-over switch, a condition will be assumed in which movement of the craft off its course is sufficient to cause the contact arm to engage compass contact 3L. The first result of this engagement as the craft is moving away from its course is to cause energization of magnet 95, thus causing movement of the controller to the left raising the contact arms 143, 144, and 145 and energizing the winding WL of the steering motor. The circuit closed for this operation, in addition to that of the pilot motor which is operating continuously, is as follows: from the positive terminal of the source, through fuse F, switch arm 146, wire 153, remote control contact 154, wire 155, compass segment 116, contact arm 114, compass contact 3L, wire 193, brush 131 cooperating with segment 126 of the change-over switch, brush COL3 of the change-over switch, wire 194, brush C3L of the controller conducting segment 119, controller brush BL, winding of magnet 95, wire 159, to ground.

The steering motor circuit has already been traced in connection with contact IL. In response to closing of the circuit just described, the steering motor moves the rudder to the left to restore the craft to its course. This left movement continues until insulating segment 122 of the controller comes into contact with controller brush C3L, whereupon the circuit of magnet 95 is broken at 122. This breaks the steering motor circuit at 169. If now the craft, in response to the left rudder movement, starts to swing back towards its course and compass contact arm strikes contact 2L, circuits are energized to cause movement of the rudder to the right, as determined by the C2L contact on the controller. Inasmuch as the insulating gap 122 is in alignment with C3L contact of the controller, brush C2L is in engagement with conducting segment 121 and magnet 96 is energized over the following circuit: Positive terminal of the source, fuse F, switch arm 146, wire 153, remote control contact 154, wire 155, compass segment 116, compass arm 114, compass contact 2L, wire 195, brush C2L, conducting segment 121, brush BR, winding of magnet 96, wire 159, to ground. This moves the contact arm 143 against its lower contact 196. Likewise, contact arms 144 and 145 are moved against their lower contacts to energize winding WR of the steering motor and including in circuit the balancing resistor 103.

Under these conditions, the circuit for the steering motor is from positive terminal of the source, through fuse F, contact arm 146, compass contact C, wires 165 and 166, relay arm 105, relay contact 167, steering motor resistance 109, wire 168, switch arm 144, switch contact 177, balancing resistor 103, wire 178, limit switch associated with conducting segment 52 on the steering motor, wire 182, winding WR of the steering motor, armature 174, wire 175, contact 176, and relay arm 106, to ground. This circuit remains closed to move the rudder to the right toward its zero position until insulating segment 122 of the controller strikes the brush C2L, whereupon the magnet 96 is deenergized and the steering motor circuit is broken at contact 177 associated with contact arm 144.

It will be obvious from this description that similar operations occur when the craft moves off its course so as to require right rudder for its restoration, and that, in such a case, the compass contacts 2R and 3R operate through connected controller contacts to restore the craft to its course.

The change-over switch is designed to operate only upon extreme movements of the craft, as in changing course, or any other movements which are sufficient to bring the contact arm 114 into engagement with either of the compass contacts 4L or 4R. As the craft moves away from its course, the contacts of the compass may be hit in succession from zero outward, or the speed of the swing may be sufficient so that contact is only made with 4L or 4R. However, it is desirable on such extreme swings that rudder be taken off in a different manner than it is put on, and consequently the change-over switch is so arranged that when the craft moves off its course so as to require, for example, operation of the circuits connected with compass contact 4R, during the restoring movement, even though contact 3R be hit, the amount of rudder applied will be that corresponding to contact 2R, since, in this way, overswing of the craft beyond its course on the return is prevented.

In order to make this clear, it will be assumed that a change in course of the craft occurs so that the contact arm 114 engages contact 4R of the compass. The circuit completed when contact 4R is hit is from the source as before, to compass contact segment 116, through contact arm 114, contact 4R, wire 197, brush C4R of the controller, controller segment 121, brush BR to energize magnet 96, over the wire 159, to ground.

This circuit is made as before when the solenoid 115 of the compass is energized over the timer 68. Likewise, the circuit is maintained by the contact disc 88 during the intervals when brush 71 rides off the conducting portion 69 of timer 68. Energization of magnet 96 moves contact arm 143 into engagement with contact 196, and likewise, contact arms 144 and 145 are moved to their downward positions where they engage contacts 177 and 192, respectively. Consequently, the controller moves to the right and winding WR of the steering motor is energized to move the rudder to the right. When controller disc 118 reaches a position in which insulating segment 122 engages brush C4R, the controller circuit is broken to deenergize the magnet 96 and thus to deenergize the steering motor circuit by breaking contact at contact arms 144 and 145.

The sharp angle of the rudder in response to this circuit energization will tend to cause the craft to start to swing rapidly toward the new course. As soon as the craft gets near enough to her course to cause R3 to be energized, counterclockwise rotation of the controller and segment 124 will occur and cause R3 to excite CR2 and consequently take rudder off to the position indicated by CR2. The effect of this is that, while on the return swing the compass contact arm 114 may engage contact 3R, the segment 125 will throw into circuit a 2R contact. The rudder movement resulting will be toward the left and will correspond to a 2R contact on the compass instead of a 3R contact, as would be the case if the craft were swinging away from its course instead of toward it.

When compass contact arm 114 strikes contact 3R with the craft swinging toward its course, the circuit completed is from the battery to compass contact arm 114 as before, then through compass contact 3R, wire 198 to brush 127, conducting segment 125 of the change-over switch, brush COR3, wire 199, brush C3R, conducting segment 119, brush BL, winding of magnet 95, wire 159, to ground. This causes the controller movement to be started to the left and lift the spring arms 143, 144, and 145 upwardly, thus closing the circuit of the WL winding of the steering motor, when spring arm 144 engages contact 169. Movement of the controller in a counterclockwise direction turns the change-over switch to connect R3 with COR2 so that movement of the rudder to the left corresponding to a 2R contact of the compass is, therefore, made.

If the swing of the craft toward its course continues, contact arm 114 may engage contacts 2R and IR in succession and rudder movements will occur of normal amount without encountering any change through the action of the change-over switch.

The action of the centering switch 137 on the controller to cause synchronization between the controller and the rudder has been set forth. The centering switch has the additional function of insuring that the rudder is centered in the quadrant when the automatic control is to be shut off at the end of a run or for taking over hand steering. The contacts O of the main switch 108 may be brought into circuit by rotation of arm 146. If the rudder is off center, the compass arm 114 will make contact to energize one of the magnets 95 or 96. Consequently, the steering motor circuit will be completed by arm 144 and the motor will run until contact 57 reaches brush 183. Relay 104 then picks up and breaks the motor circuit at 106, leaving the rudder centered. The controller continues to run until it reaches zero and centering switch contact 142 strikes segment 139. The switch 146 is then moved to the "off" position. It should also be pointed out that if, for any reason, the centering switch should become inoperative, the system would still operate to produce satisfactory steering, although the centering would not be as exact as it is with the centering switch in operation.

Assuming that the centering switch fails to operate, the action would be to cause the rudder to move around to a point where its center position would coincide with its trailing position. If we assume that the trailing position is on the left, as shown in Fig. 11 of the drawings, the quadrant would then be adjusted by hand to correct the course. Eventually the left limit of normal rudder movement and left limit of possible rudder movement would coincide. The craft would then steer with perfect stability as long as conditions to which the quadrant was adjusted continued and the amplitude of normal rudder movement would stay the same. The system would, of course, lack the exactness of the centering switch, but it would be operative and avoid any dangerous condition.

In the previous description reference has been made to a remote control socket 107. The purpose of this is to make it possible to set the main switch 108 so that hand steering of the craft may be carried out from a point on the craft remote from the steering station in order to move the craft in emergency so as to avoid obstructions or another craft. It is also desirable that this remote control shall be of such form that the automatic control can be removed from or restored to the compass by manipulation of a switch. Consequently a remote control device of the form shown in Fig. 9 may be employed.

It embodies two switch elements, one of which permits connecting of either the compass for automatic control or the remote control switch for remote manual control. When the remote manual control is thrown in, manipulation of the second switch can be used to cause craft movement either to the right or to the left, but only one degree of such movement is permitted by the switch shown, since it is only to be used in emergency, and, after a craft deflection, control will be restored to the compass, as under normal conditions.

Referring to Fig. 9, reference character 201 designates a plug having five terminals corresponding to the terminals of socket 107. The terminals of this plug will be designated the same as the terminals on socket 107. Terminal 154 is connected to the compass, 202 is the remote control terminal, 203 is the connection to the zero contact of the compass, whereas 204 and 205 are the terminals connected to contacts 4L and 4R, respectively, of the compass.

These terminals of the plug 201 are connected by wires to a casing, comprising two rigid ends connected by a flexible rubber tube 206 within which the switch contacts are mounted and which tube may be deformed by pressing at the points indicated by the arrows to operate the switch elements. The switch X, for example, when the tube 206 is pressed at point COM, throws the compass control in, since it merely serves to connect terminals 154 and 202 together. When the tube is pressed at point REM, the switch X is thrown to the opposite position to include the remote control switch in circuit.

This second switch, designated K, comprises a conducting bar 207 pivoted about and slidable on a stud 208. The stud and bar, when in the positions shown, are electrically connected by wire 209 with the terminal 203 associated with the zero contact of the compass. When the bar is pressed to disengage it from the head of stud 208, the circuit to wire 209 is broken. The bar is urged outwardly by a spring 211 and the ends of the bar engage stationary stops 212 and 213. When the tube is pressed at point Ri, this moves the bar 207 into engagement with a stationary contact 214, the bar pivoting about the stop 212. This connects the zero contact of the compass connected to terminal 203 with terminal 205 to cause a right rudder movement. Depression of the tube at point Le will bring the bar 207 into contact with a stationary contact 215, thus connecting terminals 203 and left rudder terminal 204, this time the bar pivoting about stationary stop 213.

It will thus be clear that when the steering apparatus is operating automatically, plug 201 can be inserted in socket 107 and when the switch X is moved to the position shown, the compass controls the mechanism in the normal manner. However, if remote control is to be exercised, pressure is applied at REM to move the switch X opposite to the position shown, thus throwing in the switch K. As long as bar 207 occupies the position shown, O contact circuit is closed to bring the rudder to zero, but by pressing either at Ri or Le, corresponding rudder movements may be accomplished, and when an emergency has passed, the switch X may be restored to the position shown, thus restoring control to the compass. The switches X and K are totally enclosed in a water-tight housing in which the contacts are protected from dirt and moisture. The length of cable connecting this housing with the plug 201 may be anything desired, and when the attachment is not in use it may be removed from the socket 107 and stored away.

There is a valuable feature in making it possible for a single person to handle a yacht without being compelled to remain adjacent the steering station in order to assume the helm under emergency conditions. The attachment is also valuable for all uses in which the operator desires to go away from the steering station and still be able to manipulate his craft with safety under emergency conditions.

In the specification, reference has been made to a condenser 148 included in the grounded circuit of the main switch 108. For the purpose of eliminating sparking of contacts and radiation which might cause radio interference, suitable filtering condensers may be employed. As shown in Fig. 8, the contact 162 of disc 88 is grounded through a wire 61 and a condenser 70. Likewise, the wire 156 connected to solenoid 115 is connected to a condenser 80 and by a wire 60 to the positive side of the circuit.

The circuit arrangement shown in Fig. 8 requires manual setting of the quadrant in order to fix the center of oscillation of and thus determine the neutral point of the rudder. For steering craft upon which the quadrant is connected directly to the rudder as shown, and hence in which water pressure exerts a restoring tendency on the rudder, this form of the invention steers a straight course and is particularly accurate when the boat is passing through calm water in which slight deviations from the course are very noticeable. When systems embodying this invention are to be employed in connection with larger craft, and more particularly craft in which the quadrant operates a valve or other controlling means of a power steering engine and in which the action of water pressure on the rudder exerts no effect upon the quadrant position, it is preferred to use the form of circuit shown in Fig. 10. In this form of the invention no manual setting of the quadrant is necessary nor is there any occasion for employing a centering contact on the tiller.

As pointed out in the beginning of the specification, every craft has an inherent tendency to move in one direction or the other off a course laid along its keel line. Experimentation has shown that if the steering motor be so arranged as to run faster when putting on rudder than in taking it off, the rudder will voluntarily and automatically seek the true center of oscillation and thus fix the neutral position of the rudder without any manual control. Furthermore, this center of oscillation will change automatically in response to outside influences, such as wind and waves, and produces such accurate centering that continued rudder movements will result in the rudder taking a position where the averages of left and right movements are equal and hence the ship will steer a straight and accurate course regardless of the peculiarities of the craft or changes in influences acting on the craft.

In all prior art arrangements adapted to produce this centering action of the rudder of a craft, some mechanical devices have been necessary in order to cause the rudder to seek its true center of oscillation. By practicing this invention, however, no attention whatsoever need be given to the centering action, since it is inherent and automatic under all conditions of the craft and of the sea and involves merely the use of a small relay for shunting out a resistance from the circuit of the motor whenever the motor is running in a direction to put on rudder in either direction from the neutral position. When the rudder is moving in the opposite direction, that is, when rudder is being taken off, the resistance is included in the circuit. Hence, the motor runs slower on its return travel than it does on its outward travel, and moves the rudder through a smaller angle. The resistance must be of sufficient value to overcome the tendency of the water pressure acting on the rudder to cause more rudder to be taken off than was put on.

Referring to Fig. 10, the system there shown embodies the automatic fixing of the center of rudder oscillation just described. Except for the addition of a further resistance in circuit with the steering motor, the system is similar to that shown in Fig. 8. In Fig. 10 a four-wire motor is shown instead of a three-wire motor and the controller is of slightly modified construction. It will be understood that, if desired, the motor and controller of Fig. 8 or any equivalent arrangement may be employed in the system of Fig. 10. In Fig. 10 the mechanical elements of the controller and its driving mechanism are shown in connection with the circuits in order to make it clear how the two are combined. It is to be understood that the system of Fig. 8 may be modified by rearranging the relay 104 and the balancing resistor 103 and by eliminating the centering contact on the tiller so as to produce the operation which will now be described in connection with Fig. 10.

The compass arrangement, the driving mechanism for the controller, including the pilot motor, the magnets for clutching the controller to and unclutching it from the drive, and the switches controlled in response to clutching and unclutching of the controller are similar to those described in connection with Fig. 8. Likewise, the remote control socket 307 is similar in construction and arrangement to the control socket 107, shown in Fig. 8. Where the elements correspond exactly to those previously described, further explanation will not be made, except as it is necessary in setting forth the detailed operation of the modified system.

The controller disc 318 carries two conducting segments 319 and 321 separated from each other by V-shaped sections of insulation 322 and 323, respectively. Cooperating with the V-shaped insulation 322 is an adjustable brush 344 connected to the zero contact of the compass and likewise to the zero contact of main switch 308. This brush corresponds in function to the brush B of the controller of Fig. 8, but it is made adjustable so as to produce proper timing between the controller and the other parts of the system.

Cooperating with the insulating section 323 is an adjustable brush 330 connected by wire 332 to the winding of relay 304. The other terminal of this relay 304 is connected by wire 333 to brush 334 cooperating with two transverse conducting bars carried in insulating disc 388. This disc is driven from the large controller disc, as in Fig. 8, and the conducting bars are grounded, so that brush 334 completes a connection to ground for one side of relay 304 in any one of four positions of the disc 388. The arrangement and timing of disc 388 and of the controller is such that relay 304 is always energized by the controller when the steering motor is moving the rudder away from its neutral position, but it is never energized when the rudder is moving toward that position. The timing relation between disc 388 and timer 368 is such that on large swings of the craft the steering motor may start and stop several times.

The relay 304 operates to overthrow the rudder on all outward swings. It has an armature 305 cooperating with a front contact 306. A resistor 300 is included in circuit with the winding 329 of the motor M when relay 304 is deenergized as shown. When, however, the relay is energized to close its front contact, the resistor 300 is short-circuited thus causing the motor to receive more current and to run faster.

The controller includes the change-over switch 324 which operates in the manner described in connection with Fig. 8 to alter the relationship between the movements of putting on and taking off rudder, after the craft starts to swing toward its set course subsequent to a severe yawing movement or when a change in course is made. The change-over switch contains a movable arm 336 cooperating with suitable stationary stops in the controller plate.

The centering switch comprises segment 338 and brushes 341 and 342. The operation is similar to that described in connection with Fig. 8.

In order to make the operation of the system shown in Fig. 10 more clear, two typical circuits will be traced. It will first be assumed that the switch 308 is adjusted as shown, thus completing circuits for compass control. This starts the pilot motor 364, the circuit of which is from the positive terminal of source S, through wire 382, contact C and switch arm 346, wire 383, winding of pilot motor 364, variable resistance 302, to ground. This motor runs at constant speed and drives the timer disc 368 as well as the gears 373 and 376.

Rotation of timer disc 368 opens and closes the circuit of solenoid 315, which circuit is from the positive terminal of the source, through the main switch, wire 384, solenoid 315, wire 385, brush 371, and conducting bar 369, to ground.

If it be assumed that a craft movement takes place to cause contact arm 314 to engage contact IL, the motor M will be energized to cause a left rudder movement over the following circuit: Positive terminal of the source, wire 382, arm 346 and contact C of main switch 308, wire 384, compass segment 316, contact arm 314, contact IL, wire 386, controller brush CIL, conducting segment 319, controller brush BL, wire 387, winding of magnet 395, wire 390, brush 334, one of bars 389 on disc 388, to ground. Energization of the magnet 395 moves the arm 379 upwardly, thus causing pinion 377 to drive the controller disc through the intermediate gearing, the drive being in a counterclockwise direction tending to bring the V-shaped insulating segment 322 into registry with brush CIL.

As soon as the controller starts to turn, segment 319 is brought into engagement with brush 330, thus supplying positive current to the relay 304 and picking up armature 305, and short-circuiting the resistance 300. Lifting of arm 379 by energization of magnet 395 closes the circuit of motor M, this circuit being from the positive terminal of source S, over wire 391, helm adjusting resistance 309, wire 392, contact 306 and armature 305 of relay 304, wire 393, field 329 of the motor to contact arm 398, contact 399, wire 400, armature of motor M, wire 401, contact 402, contact arm 403, to ground at 404. Since the resistance 300 is shunted out, the motor will run at a speed determined by the helm resistance 309 to move the rudder to a position determined by the proportioning of the parts, and until the controller brings insulating segment 322 into alignment with brush CIL. At that point the circuit to magnet 395 is broken and the steering motor circuit broken by dropping of the arm 379, thus disengaging the contact arms 398 and 403 from their upper coacting contacts 399 and 402, respectively.

The controller will now be in a position in which the ring 321 engages brush 344 and hence when restoration of the craft to its course causes the compass contact arm to engage its zero contact, a circuit is closed to drive the steering motor and to move the rudder to the right, thus restoring the rudder to its mid position.

The magnet 396 will be energized over a circuit from the positive terminal of the source to the compass contact 314, as previously traced, then through the zero contact of the compass, wire 405 to brush 344, controller segment 321, brush BR, wire 406, winding of magnet 396, wire 390 and brush 334, to ground on the disc 388. Under these conditions, no current is supplied to the segment 319 of the controller with which the brush 330 is in engagement. Hence, relay 304 is deenergized and its armature occupies the lower position in which the resistance 300 is included in the steering motor circuit.

The circuit for the steering motor is then from the positive terminal of the source, through wire 391, steering motor adjusting resistance 309, wire 392, resistance 300, wire 393, field winding 329 of motor M, contact arm 398, contact 407, wire 401, armature of motor M, wire 400, balancing resistor 303, contact 408, contact arm 403, to ground at 404. Since this circuit includes the resistance 300, the motor will run at slower speed and its movement toward the neutral position will be less than that which it had in moving away from that position in response to engagement of the compass arm with contact IL. This action automatically brings the center of oscillation of the rudder to a point in the quadrant which maintains the craft on its course and in which the averages of the rudder deflections on both sides of the neutral position are the same. It will be understood that the relay 304 will operate in the system shown only to include the resistance 300 when contact arm 314 is taking off rudder and is in no sense caused by rudder movements themselves. Inasmuch as the detailed circuit operation of the system shown in Fig. 8 has been described, further description of the system of Fig. 10 will be superfluous.

As pointed out above, the system shown in

Fig. 8 is the preferred form, especially when the system is installed on craft where the quadrant operates directly upon the rudder. Likewise, the system shown in Fig. 10 may be preferable in installations on craft where the quadrant controls the rudder, not directly, but through the valve or other controlling device of a power steering engine.

As pointed out above, systems embodying this invention are suitable for use either by direct connection to a rudder, as shown in Fig. 8, or by application to the control of a valve or other controlling device of a power steering engine. Under some conditions it may be desirable to make installations on craft having an outboard rudder arrangement or a double rudder arrangement. The manner of making such an installation for a double rudder outboard system is shown in Fig. 12, wherein two rudders 616 and 617 are pivoted to the hull of the boat and carry extended arms 618 and 619, respectively. The construction of the tiller and quadrant is exactly the same as that shown in Fig. 2, except that they are attached to a stud 621 instead of a rudder post. The shaft 647 is extended above the quadrant driving gears to support a collar 622 having integral arms 623 and 624 pivoted to the ends of arms 618 and 619 at 625 and 626, respectively. The steering cables for manual setting of the quadrant are indicated at 627.

The manner of operation of the system will be obvious, since the circuit controlling mechanism is arranged exactly as previously described. However, the motion of the tiller is transmitted from the forward end of the same instead of from the rear end, as shown in Fig. 2. The arrangement of Fig. 12 may be adopted whether one or two rudders are to be used. If a single rudder is to be used, one of the arms 623 or 624 will be omitted and the post 621 so located as to permit the single rudder to be placed midway between the sides of the craft.

The showing of Fig. 12 likewise indicates the manner in which the tiller and quadrant may be mounted when control is exerted on the valve of a steering engine, or any similar arrangement in which the quadrant is not connected directly to the rudder.

The systems shown and described are of flexible character and may be applied to various sizes of craft in accordance with characteristics of those craft. The outstanding advantages of both the systems described are that helm adjustment may be accomplished at any time by merely varying a simple variable resistance located adjacent the steering station. Such an adjustment varies the amount of helm in both directions and is unaffected by rudder positions and can be carried out by persons totally unfamiliar with the construction and arrangement of the parts. Furthermore, the simple observation of the response of the mechanism will be sufficient to enable said adjustment to be made.

It should be understood that if a resistance is used in a follow-up system to control the speed of a steering motor, it does not affect the angle of throw of the rudder, but only the rate of movement. In this system which operates on a fixed time basis, the resistance changes the angle of rudder movement.

Furthermore, the system offers the very marked advantage of assuring that the rudder and controller will be synchronized at all times and that, when the mechanism is shut off, the rudder will be centered accurately with respect to the quadrant so as to make the apparatus available for hand steering and avoiding accidents which might occur through failure to observe that the rudder was not properly centered. The importance of having the system composed of several isolated units which can be replaced by simply removing a plug is marked and far-reaching.

Although two systems embodying this invention have been shown and described, it will be obvious that the elements of these systems may be combined in other ways, within the scope of the claims, without departing from the spirit and scope of the invention.

What is claimed is:—

1. That method of controlling the movements of a dirigible craft in one plane, which consists in subjecting the rudder to a permanent bias to bring its trailing and neutral positions into coincidence, and then artificially causing rudder movements toward and away from the neutral position to be unequal.

2. That method of controlling the movements of a dirigible craft in one plane, which consists in subjecting the rudder to a permanent bias to bring its trailing and neutral positions into coincidence, and then artificially causing all rudder movements except the last toward the neutral position to exceed corresponding movements away from the neutral position.

3. That method of controlling the movements of a dirigible craft in one plane, which consists in subjecting the rudder to a permanent bias to bring its trailing and neutral positions into coincidence, and then artificially causing rudder movements away from the neutral position to exceed movements toward the neutral position.

4. The method of automatically fixing the center of oscillation of the rudder of a craft which method consists in overthrowing the rudder in all its movements away from the neutral position.

5. That method of controlling the rudder of a dirigible craft, which consists in causing the rudder-actuating mechanism to move the rudder farther on its return travel than on its outward travel, and causing the rudder to stop in its neutral position after an outward swing.

6. That method of controlling the rudder of a dirigible craft to cause it to seek its neutral position automatically, which consists in causing the rudder to swing farther in all its outward movements than in its return movements.

7. In an automatic steering system for dirigible craft comprising a rudder; motor means for actuating said rudder, said means being constructed and arranged to permit the rudder to seek its free trailing position; and means acting on said motor for causing the free trailing position of the rudder to coincide approximately with the neutral position of the rudder.

8. In an automatic steering system for dirigible craft, a rudder constructed and arranged to seek its free trailing position, and non-yielding means for causing the free trailing position of the rudder to coincide approximately with the neutral position of the rudder.

9. In an automatic steering system including an electric steering motor unit adjacent the rudder, and a course-indicating unit and an electric controlling unit remote from the steering motor unit, that method of maintaining synchronism between the rudder and controller which consists in causing the rudder to pass through a fixed point whenever it returns to proximity to its trailing position, and stopping the rudder at that point while the controller returns to its zero position.

10. In an automatic steering system including an electric motor for operating the rudder, and a course indicator and electric controller located remote from said motor, that method of synchronizing the rudder and controller which consists in causing the rudder to move farther when swinging away from center than in returning to center.

11. In an automatic steering system for dirigible craft having a rudder, an electric steering motor; compass controlled means including an electric contact device; an electric controller for causing operation of the steering motor in response to movements of the compass controlled means, said controller and motor being constructed and arranged to operate in synchronous relation independently of any follow-up connection; and a variable resistance in circuit with said motor for varying the angle of rudder movement.

12. In an automatic steering system for dirigible craft having a rudder, an electric steering motor; an electric controller for said motor, said motor and controller being constructed and arranged to operate independently but in predetermined synchronized relation; means for causing operation of said controller in response to movements of the craft relative to a set course; and an adjustable electric resistance permanently in circuit with said motor for varying the angle of rudder movement.

13. In an automatic steering system of the non-follow-up type for dirigible craft having a rudder, an electric steering motor; an electric controller for said motor; means responsive to changes in the heading of the craft for causing operation of said controller; means for causing said motor and controller to maintain a predetermined synchronized relation; and means remote from said steering motor for varying the speed of the steering motor to adjust the rudder angle.

14. That method of controlling the rudder of a dirigible craft to keep the craft on its course, which method consists in artificially causing all rudder movements toward and away from the neutral position to be unequal.

15. That method of controlling the rudder actuating means of a dirigible craft to hold the craft on its course, which consists in causing all rudder movements away from the neutral position to exceed movements toward that position.

16. That method of controlling the rudder actuating mechanism of a dirigible craft having an inherent tendency to deviate from its course, which consists in causing all rudder movements away from that direction in which the craft inherently tends to turn to exceed rudder movements in that direction.

17. An automatic steering system for dirigible craft having a rudder, comprising rudder actuating means; a controller operating independently of the rudder; means responsive to changes in heading of the craft for causing actuation of the controller; and means responsive to the direction of controller movement for varying the amount of rudder movement.

18. An automatic steering system for dirigible craft, comprising a rudder; means for actuating the rudder; a non-follow-up controller for said means; means responsive to changes in heading of the craft for causing actuation of the controller; and means responsive to direction of controller movement for causing all rudder movements away from the set course to exceed rudder movements toward that course.

19. An automatic steering system for dirigible craft, comprising a rudder; means for actuating the rudder; a controller for said means; means responsive to changes in the heading of the craft for causing operation of the controller; and means for causing the rudder-actuating means to overthrow the rudder in all movements except the last toward the set course.

20. An automatic steering system for dirigible craft, comprising a rudder; an electric rudder-actuating motor; an electric controller; means responsive to changes in heading of the craft for causing actuation of the controller; and relay controlled means associated with said motor, and responsive to direction of controller movement for causing all rudder movements away from the set course to exceed rudder movements toward the set course.

21. An automatic steering system for dirigible craft, comprising a rudder; an electric rudder-actuating motor; an electric controller; means responsive to changes in heading of the craft for causing actuation of the controller; a resistance element; and a relay responsive to changes in direction of controller movement for including said resistance element in circuit with the motor during rudder movements in the direction of yaw of the craft, and for shunting out said resistance during rudder movements in the opposite direction.

22. An automatic steering system for dirigible craft, comprising a rudder; rudder actuating means; means responsive to changes in heading of the craft for controlling rudder movements; and means for causing all rudder movements away from the neutral position of the rudder to exceed rudder movements toward that position.

23. An automatic steering system for dirigible craft, comprising a rudder; rudder actuating means; means responsive to changes in heading of the craft for controlling rudder movements; and relay-operated means for causing rudder movements away from the neutral position to exceed rudder movements toward that position.

24. An automatic steering system for dirigible craft, comprising a rudder; an electric steering motor; a controller for said motor; means responsive to changes in the heading of the craft for causing operation of said controller; an electric resistance element; and a relay controlled by changes in direction of controller movement for connecting said resistance in circuit with the motor when rudder is being taken off and shunting it out when rudder is being put on.

25. A steering system for dirigible craft, comprising a rudder; a steering motor; a controller for said steering motor; a pilot motor for driving said controller; means responsive to craft movements for causing said controller to be driven by said pilot motor; and means for causing the controller to complete its movements in response to craft movements independently of the movement of the rudder.

26. In a steering system for dirigible craft, a rudder; a tiller connected to the rudder; a quadrant; means for fixing the quadrant in course-setting position; a steering motor wholly mounted on said tiller; and a driving connection between the motor and quadrant to cause movement of said tiller and rudder.

27. In a steering system for dirigible craft, a rudder; a tiller rigidly connected to said rudder; a quadrant loosely connected to said tiller; means for fixing said quadrant against movement; a motor mounted on said tiller; and a worm and gear connection between said motor and said quadrant to cause movement of said tiller with respect to the quadrant when said motor is operating, but permitting concerted movement of the quadrant and tiller when the quadrant is actuated.

28. In a steering system, a rudder having a tiller connected thereto; a quadrant connected to said rudder; a steering motor mounted on said tiller and movable therewith; and a one-way driving connection between said motor and said quadrant.

29. In a steering system for dirigible craft, a rudder having a rudder post; a quadrant loosely mounted on said post; a tiller operatively connected to said rudder post; a steering motor mounted on and movable with said tiller; and a worm and gear drive between said motor and quadrant to actuate the tiller and rudder when the motor is operating and the quadrant is held, but causing concerted movement of tiller and quadrant when the quadrant is moved.

30. An automatic steering system for dirigible craft, comprising a rudder; a quadrant; a steering motor; a controller for said steering motor; a motor for driving said controller; means controlled by changes in the heading of the craft for causing operation of said controller irrespective of the position of the rudder; and a manually operated switch element for causing said controller and steering motor to move said rudder to a central position in the quadrant automatically.

31. An automatic steering system for dirigible craft, comprising a rudder; a tiller connected to the rudder; a quadrant; a steering motor; course controlled means for causing operation of the steering motor; and an electric contact device controlled by the tiller for breaking the steering motor circuit when the tiller occupies a predetermined position with respect to the quadrant.

32. An automatic steering system for dirigible craft, comprising a rudder; a steering motor; a non-follow-up controller for said steering motor; a pilot motor for driving said controller; electromagnetic means responsive to changes in the heading of the craft for causing actuation of the controller; and means operated by said controller for causing operation of the steering motor in a direction to cause the craft to follow a set course.

33. In an automatic steering system including a rudder, rudder actuating means, and a controller for said means operated independently of the position of the rudder; that method of synchronizing the rudder and controller which consists in causing rudder movements toward and away from the neutral position of the rudder to be unequal.

34. In an automatic steering system including a direction controlling element, and a controller operated independently of the position of said element, that method of obtaining synchronization of said element and said controller which consists in causing all movements of said element away from the neutral position to exceed its movements toward that position.

35. That method of counteracting the inherent tendency of a craft having an electric rudder motor to deviate from a set course, which consists in imparting a permanent compensating bias to the windings of said motor.

36. In an automatic steering system for dirigible craft, a steering motor; a rudder operated by said motor; a controller for causing operation of said motor for predetermined periods of time; means for causing operation of said controller independently of the movements of the rudder; and means for varying the speed of said motor for varying the angle of rudder applications.

37. In an automatic steering system for dirigible craft having a rudder, a steering motor; a controller for said motor; means responsive to the heading of the craft for causing operation of said controller for predetermined periods of time and independently of said rudder; and means for varying the speed of said motor, for varying the angle of rudder throw.

38. In an automatic steering system for dirigible craft having a rudder, a reversible steering motor; a controller for said motor; means responsive to the heading of the craft for causing operation of said controller for predetermined periods of time and independently of said rudder; and an adjustable resistance in circuit with said motor for varying the angle of rudder application.

39. In an automatic steering system for dirigible craft having a rudder; a reversible steering motor; a controller for said motor; means responsive to the heading of the craft for causing operation of said controller for fixed time periods and independently of the rudder; and an electric resistance in circuit with said motor for causing the rudder to move symmetrically with respect to its neutral position.

40. In an automatic steering system for dirigible craft having a rudder; a reversible steering motor; a controller for said motor; means responsive to the heading of the craft for causing operation of said controller for fixed time periods and independently of the rudder; and an electric resistance element in circuit with said motor only during rotation of said motor in a predetermined direction for causing the rudder to be actuated symmetrically with respect to its neutral position.

41. An automatic steering system for dirigible craft, comprising a rudder; a steering motor; a compass including an electromagnetically operated contact device; a controller for the steering motor; means for driving the controller; means for causing selective movement of the controller in response to operation of the compass contact device; means for periodically energizing the electromagnetic means on the compass to operate the contact device; and circuit controlling means for maintaining energization of the controller actuating means during the intervals when the electromagnetic means on the compass is ineffective and the controller is displaced from its zero position.

42. In a steering system for dirigible craft having a rudder subject to greater load when moving in one direction than when moving in the other direction, a reversible motor for operating said rudder; a resistance element; and means for including said element in circuit with said motor for one direction of rotation and for shunting it out in the other direction of rotation whereby the motor is caused to rotate at substantially equal speeds in both directions.

43. In an automatic steering system for dirigible craft having a rudder; a steering motor; a controller for starting and stopping said motor; means tending to cause the rudder to pass through a fixed point on movements toward the center; and means for rendering the steering motor ineffective when the rudder reaches said point, and for maintaining it ineffective until the controller reaches a predetermined position, whereby the rudder and controller are maintained in synchronized relation.

44. The combination set forth in claim 43, wherein manually operable means are provided for setting the fixed point to maintain a set course.

45. In an automatic steering system for dirigible craft having a rudder, a reversible steering motor for operating the rudder; a controller for said motor, said controller being operated independently of said rudder; and means for controlling the motor to cause greater application of rudder when the craft is departing from its course than when it is returning to its course, whereby synchronism is maintained between the rudder and controller.

46. The method of synchronizing the movement of the rudder and controller in an automatic steering system of the type in which the controller operates independently of the rudder, which method consists in causing more rudder to be applied when the craft is departing from its course than when it is returning toward its course.

47. An automatic steering system for dirigible craft, comprising a rudder; a motor for moving said rudder; a motor controller having a zero position; compass-controlled means for causing actuation of said controller; electromagnetic switching means for causing energization of said motor; a timing circuit for causing actuation of the compass-controlled means; and circuit controlling means for maintaining the motor circuit closed during the intervals when said timing circuit is open and the controller is displaced from its zero position.

48. In an automatic steering system for dirigible craft having a rudder, a reversible steering motor; a controller for said motor; compass-controlled contact means; a pilot motor; electromagnetic means responsive to said contact means for causing actuation of said pilot motor to drive said controller, and for causing selective energization of the motor; and means controlled by movement of the rudder for deenergizing the steering motor.

49. An automatic steering system for dirigible craft comprising a rudder; a reversible steering motor; a controller; a pair of electromagnets for causing actuation of said controller in one direction or the other; compass-controlled means for selectively energizing said electromagnets; switching means for causing energization of the steering motor in response to energization of one of said electromagnets; a resistance element; and means for placing said resistance element in circuit with said motor when the rudder is being moved away from its neutral position.

50. An automatic steering system for dirigible craft comprising a rudder; a reversible steering motor; a controller; a pair of electromagnets for causing actuation of said controller in one direction or the other; compass-controlled means for selectively energizing said electromagnets; switching means for causing energization of the steering motor in response to energization of one of said electromagnets; a resistance element; and means for selectively including said resistance element in the motor circuit in accordance with the direction of rudder movement.

51. An automatic steering system for dirigible craft comprising a rudder; a reversible steering motor; a controller; a pair of electromagnets for causing actuation of said controller in one direction or the other; compass-controlled means for selectively energizing said electromagnets; switching means for causing energization of the steering motor in response to energization of one of said electromagnets; a helm adjusting resistance permanently in circuit with said motor; a second resistance; and relay operated means for including said second resistance in the motor circuit when the rudder is moving away from its neutral position.

52. In an automatic steering system for dirigible craft, a rudder; a reversible steering motor; a controller for said motor; a pilot motor for operating said controller; compass-controlled means for causing actuation of the controller independently of the rudder; electromagnetic means for selectively energizing the steering motor in response to compass indications; and means for breaking the steering motor circuit without disturbing the actuation of the controller.

53. The method of automatically fixing the center of oscillation of the rudder of a dirigible craft, which consists in overthrowing the rudder in all movements of the craft away from a set course.

54. That method of maintaining synchronism between the rudder and controller of a steering system for dirigible craft in which controller movements are independent of rudder movements, which method consists in causing the rudder-actuating mechanism to move in larger steps on its return travel than on its outward travel, and causing the rudder to stop in its neutral position after an outward swing.

55. That method of maintaining synchronism between the rudder and controller of a steering system for dirigible craft in which controller movements are independent of rudder movements, which method consists in causing the rudder to swing farther in all its outward movements than in its return movements.

56. That method of controlling the rudder actuating means of a dirigible craft to hold the craft on its course which consists in causing all rudder movements while the craft is deviating from its course to exceed rudder movements while the craft is returning toward its course.

57. An automatic steering system for dirigible craft, comprising a rudder; means for actuating the rudder; a controller for said means; means responsive to changes in the heading of the craft for causing operation of the controller; and means for causing the rudder-actuating means to overthrow the rudder in all movements except the last, toward the set course.

58. That method of controlling the rudder of a dirigible craft which consists in establishing a neutral position for the rudder in which position the rudder-actuating means is ineffective when taking off rudder, and in causing said rudder to seek said neutral position by making all rudder movements except the last toward said neutral position exceed rudder movements away from said neutral position.

59. That method of automatically controlling the rudder of a dirigible craft, which consists in moving the rudder in a series of steps in a direction to counteract any swing off the course until the swing stops, and then during a return swing of the craft toward the course moving the rudder in a series of steps in an opposite direction, and making all of said last mentioned steps, except the last, of greater amplitude than corresponding ones of said first mentioned steps.

60. An automatic steering system for dirigible craft, including a rudder; a steering motor; a controller for said steering motor; compass controlled means for operating said controller; and means constructed and arranged to maintain synchronous operation of the controller and rudder without a follow-up connection.

61. In a steering system for dirigible craft, a rudder; a tiller connected to the rudder; a quadrant; means for fixing the quadrant in course-setting position; an electric motor mounted on said tiller and movable with it; and a driving connection between the motor and quadrant to cause movement of said tiller and rudder.

62. An automatic steering system for dirigible craft having a rudder and comprising a plurality of replaceable unit assemblies including a steering motor unit located at the stern of the craft; a compass unit located at the steering station of the craft and including an electromagnetically operated contact device; a circuit controller for the steering motor and comprising a unit located at the steering station; means for driving the controller; means for periodically energizing the electromagnetic means on the compass to operate the contact device; circuit controlling means for maintaining energization of the controller actuating means during the intervals when the electromagnetic means on the compass is ineffective and the controller is ineffective; electric cable connections between said units for operatively associating the said units; and detachable plug-in connecting means between each connection and its associated unit or units.

63. An automatic steering system for dirigible craft having a rudder and comprising a plurality of replaceable unit assemblies including a steering motor unit; a controller unit including a non-follow-up controller for said steering motor, said controller unit being located at a position remote from said steering motor unit; a pilot motor for driving said controller; electromagnetic means responsive to changes in the heading of the craft for causing actuation of the controller; means operated by said controller for causing operation of the steering motor in a direction to cause the craft to follow a set course; electric cable connections between said units for coordinating the operation of the same; and detachable plug-in connecting means between each connection and its associated unit or units.

64. An automatic steering system for dirigible craft, including a rudder; a steering motor; compass-controlled means for operating said steering motor to actuate the rudder; and means for maintaining synchronous operation of the compass-controlled means and rudder without a follow-up connection.

BRADFORD B. HOLMES.